(12) United States Patent
An et al.

(10) Patent No.: US 9,295,972 B2
(45) Date of Patent: Mar. 29, 2016

(54) MIXING REACTOR FOR HETEROGENEOUS FLUIDS USING HIGH-SPEED EJECTING

(71) Applicant: Korea Kumho Petrochemical Co., Ltd., Seoul (KR)

(72) Inventors: Ick Jin An, Daejeon (KR); Chan Hyun Park, Daejeon (KR); Kyoung Ho Row, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 9 days.

(21) Appl. No.: 14/320,161

(22) Filed: Jun. 30, 2014

(65) Prior Publication Data

US 2015/0158010 A1    Jun. 11, 2015

(30) Foreign Application Priority Data

Dec. 10, 2013  (KR) .................. 10-2013-0153286
Mar. 25, 2014  (KR) .................. 10-2014-0034853

(51) Int. Cl.
*B01J 19/26*  (2006.01)
*B01F 5/02*  (2006.01)
*B01J 19/00*  (2006.01)
*B01J 19/24*  (2006.01)

(52) U.S. Cl.
CPC ............... *B01J 19/26* (2013.01); *B01F 5/0256* (2013.01); *B01F 5/0262* (2013.01)

(58) Field of Classification Search
CPC ............ B01J 19/00; B01J 19/24; B01J 19/26
See application file for complete search history.

(56) References Cited

U.S. PATENT DOCUMENTS 6,877,960 B1 *  4/2005  Presz, Jr. ................... F04F 5/46
                                                          417/183
2006/0153002 A1 *  7/2006  Ryan ..................... B01F 5/0413
                                                          366/162.4

FOREIGN PATENT DOCUMENTS

JP    2004-529987 A    9/2004
JP    2011-529947 A    12/2011
KR    10-2013-0099200 A    9/2013

OTHER PUBLICATIONS

Office action mailed Apr. 27, 2015 from Japanese patent office in a counterpart Japanese application.

* cited by examiner

*Primary Examiner* — Natasha Young
(74) *Attorney, Agent, or Firm* — The PL Law Group, PLLC (57) ABSTRACT

A mixing reactor for heterogeneous fluids includes a first inlet part for introducing a first fluid, a first nozzle to eject the first fluid, a fluid chamber having a first space portion and a second space portion having a larger inner diameter than that of the first space portion, a second inlet part for introducing a second fluid, a second nozzle to eject the second fluid, a mixing chamber, and a third nozzle part to eject the second fluid. In the mixing reactor for heterogeneous fluids, two or more fluids are effectively collided with each other to enhance mixing uniformity, reduce side reactions, and thus improve reaction yield and reaction rate, and allow for simple maintenance and reuse.

14 Claims, 6 Drawing Sheets

MIXING REACTOR FOR HETEROGENEOUS FLUIDS USING HIGH-SPEED EJECTING

CROSS-REFERENCE TO RELATED APPLICATION

This application claims priority to and the benefit of Korean Patent Application No. 10-2013-0153286, filed on Dec. 10, 2013 and Korean Patent Application No. 10-2014-0034853, filed on Mar. 25, 2014, the disclosures of which are incorporated herein by reference in its entirety.

BACKGROUND

1. Field of the Invention

The present invention relates to a mixing reactor for heterogeneous fluids using high-speed ejecting, and more particularly, to a mixing reactor for heterogeneous fluids, in which two or more fluids are effectively collided with each other to enhance mixing uniformity, reduce side reactions, and thus improve a reaction yield and a reaction speed.

2. Description of the Related Art

Conventionally, a sparger or a disperser has been used in a reactor such as a continuous stirred reactor to mix or react heterogeneous fluids.

Figure 1:
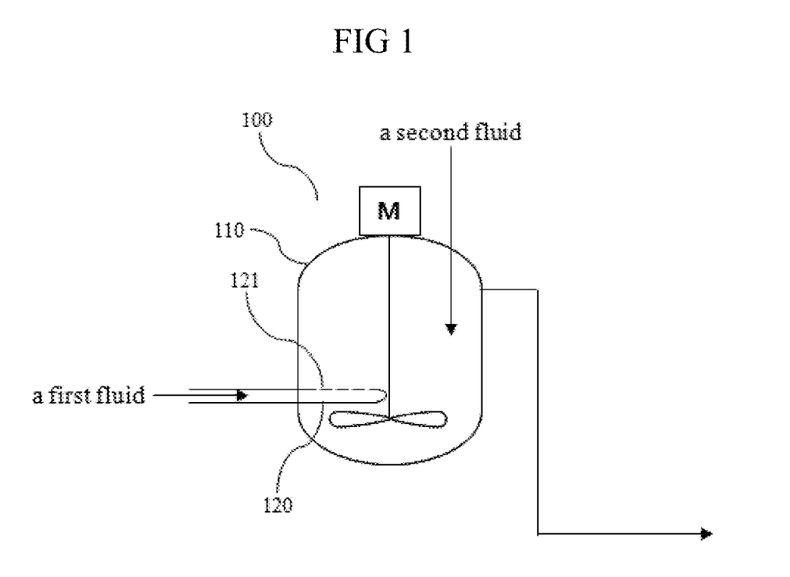
FIG. 1 is a schematic view illustrating a conventional mixing reactor for mixing heterogeneous fluids.

FIG. 1 shows a conventional mixing reactor 100 for mixing heterogeneous fluids. The mixing reactor 100 is designed to react a first fluid directly ejected through a through-hole 121 of a nozzle 120 provided in a reaction vessel 110 with a second fluid supplied into the reaction vessel 110. However, the reactants may be non-uniformly mixed according to the position of the nozzle 120, the number of through-holes 121, the ejecting speed of the first fluid, or the like, and thus unnecessary side reactions may be generated. Further, in a case in which a by-product from a side reaction is a solid material or a highly viscous liquid material, the by-product may be attached onto the sides, the bottom, or the top of the reactor, and thus performance of the reactor may be degraded. Also, the costs for cleaning the attached by-product are increased, and since the operation of the reactor needs to be stopped for the cleaning process, production efficiency may be deteriorated.

A measure has been proposed wherein the temperature of the reactor is limited to a range of about 70 to 80° C. to suppress side reactions between the reactants and the products. However, in this case, the effects of reducing the side reactions are not great, and a reverse effect may be generated in which reaction yield may be lowered or reaction rate may be considerably reduced.

Therefore, there is an increased demand for a mixing reactor for heterogeneous fluids which enhances the mixing uniformity, the reaction rate, and the production yield, and which may be simply maintained and easily reused.

SUMMARY

In one embodiment, provided is a mixing reactor for heterogeneous fluids in which two or more fluids are effectively collided with each other and thereby enhances mixing uniformity, reduces side reactions, and thus improves reaction yield and reaction rate, and allows for simple maintenance and reuse.

According to one aspect, provided is a mixing reactor for heterogeneous fluids using high-speed ejecting including a first inlet part to which a first fluid is introduced from the outside, a first nozzle coaxially connected to a downstream side of the first inlet part to eject the first fluid, a fluid chamber formed to be coaxially spaced apart from the first nozzle and configured to have a first space portion and a second space portion having a larger inner diameter than that of the first space portion, a second inlet part radially connected to an outer circumferential surface of the fluid chamber and to which a second fluid is introduced from the outside, a second nozzle coaxially connected to a downstream side of the first space portion to eject the second fluid, a mixing chamber formed to be coaxially spaced apart from an inner circumferential surface of the second space portion and coaxially connected to downstream sides of the first nozzle and the second nozzle, and a third nozzle configured to extend from the inner circumferential surface of the second space portion and radially connected to an outer circumferential surface of the mixing chamber to eject the second fluid.

The mixing chamber may include an expanded cross section portion and a constant cross section portion, and an angle between a generatrix of the expanded cross section portion and an axis of a downstream side of the mixing chamber may be within a range of 70° to 90°.

The second inlet part may include a plurality of pipes formed and spaced apart from each other at a constant angular distance.

The second inlet part may include two pipes opposite to each other.

The second nozzle may be a ring-shaped fluid passage formed to extend from a distal surface of the downstream side of the first space portion or an inner circumferential surface of the first space portion to a distal end of an upstream side of the mixing chamber.

A distal end of the downstream side of the second nozzle may be formed around a distal end of the downstream side of the first nozzle.

The third nozzle may include a plurality of nozzles formed and spaced apart from each other at a constant angular distance.

The third nozzle may include two nozzles that are symmetrical to each other with respect to an axis of the mixing chamber.

An angle between an axis of each nozzle and an axis of the downstream side of the mixing chamber may be within a range of 70° to 90°.

The axis of each nozzle and the axis of the downstream side of the mixing chamber may be in the same plane.

Each of the first fluid and the second fluid may be independently and differently selected from an amine compound and a phosgene compound.

The amine compound may be an aromatic amine compound.

The aromatic amine compound may be one or more selected from the group consisting of 2,4'-methylene diphenyl diamine (MDA) or 4,4'-methylene diphenyl diamine, toluene diamine (TDA), hexamethylene diamine (HMD), diaminobenzene, 2,6-xylidine, naphthyl diamine (NDA), and an isomer compound thereof.

BRIEF DESCRIPTION OF THE DRAWINGS

The above and other embodiments, features, and advantages of the present invention will become more apparent to those of ordinary skill in the art by describing in detail exemplary embodiments thereof with reference to the accompanying drawings, in which.

DETAILED DESCRIPTION

Hereinafter, the present invention will be described with reference to accompanying drawings. However, the present invention is not limited to the described embodiments, and it should be understood that the present invention includes all of equivalents and substitutes included within the technical scope and spirit of the invention. With respect to the drawings, the same reference numerals are given to the same or corresponding parts and parts that are not related to the description of the present invention will be omitted to clearly explain the present invention.

In this specification, it is to be noted that the expression "a certain construction element is connected to another construction element" means that the certain construction element is directly connected to another construction element, and the expression also encompasses a third construction element may be interposed therebetween. Further, it is understood that terms "comprises," "comprising," "includes," or "has" do not exclude the existence of one or more other features, numerals, steps, operations, elements, and components or the existence of the combination of these or additional possibility beforehand.

Hereinafter, the embodiments of the present invention will be described in detail with reference to accompanying drawings.

Mixing Reactor for Heterogeneous Fluids Using High-Speed Ejecting

Figure 2:
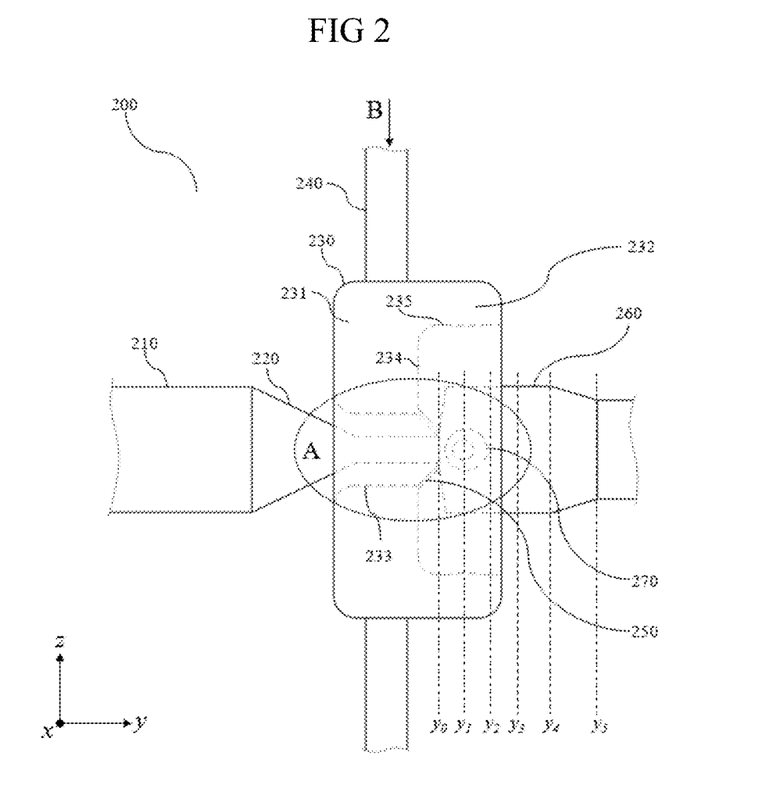
FIG. 2 is a cross-sectional view taken along a y-z plane of a mixing reactor for heterogeneous fluids using high-speed ejecting according to one embodiment of the present invention.

FIG. 2 is a cross-sectional view taken along a y-z plane of a mixing reactor for heterogeneous fluids using high-speed ejecting according to one embodiment of the present invention.

Referring to FIG. 2, one embodiment of the present invention provides a mixing reactor 200 for heterogeneous fluids using high-speed ejecting including a first inlet part 210 to which a first fluid is introduced from the outside; a first nozzle 220 coaxially connected to a downstream side of the first inlet part 210 to eject the first fluid; a fluid chamber 230 formed to be coaxially spaced apart from the first nozzle 220 and configured to have a first space portion 231 and a second space portion 232 having a larger inner diameter than that of the first space portion 231; a second inlet part 240 radially connected to an outer circumferential surface of the fluid chamber 230 and to which a second fluid is introduced from the outside; a second nozzle 250 coaxially connected to a downstream side of the first space portion 231 to eject the second fluid; a mixing chamber 260 formed to be coaxially spaced apart from an inner circumferential surface of the second space portion 232 and coaxially connected to downstream sides of the first nozzle 220 and the second nozzle 250; and a third nozzle 270 configured to extend from the inner circumferential surface of the second space portion 232 and radially connected to an outer circumferential surface of the mixing chamber 260 to eject the second fluid.

The terms "upstream" and "downstream" mean the relative location of one fluid or between elements according to a flow direction or flow sequence of the fluid in the mixing reactor for heterogeneous fluids using high-speed ejecting, and in general, the "upstream" is an area to which the fluid is introduced, and the "downstream" is an area to which the fluid is discharged.

The first inlet part 210 is a passage through which the first fluid is introduced from the outside and flows to an upstream side of the first nozzle 220. A cross section of the first inlet part 210 is not limited, but the first inlet part 210 may be formed of a cylindrical pipe having a circular shape in section.

The first nozzle 220 is substantially coaxially connected to the downstream side of the first inlet part 210 to eject the first fluid introduced through the first inlet part 210 to the mixing chamber 260.

Further, the first nozzle 220 may be formed of a single cylindrical pipe having a constant diameter, and the diameter of the first nozzle 220 may be smaller than that of the first inlet part 210. Reduction in the diameter from the first inlet part 210 to the first nozzle 220 may be continuous or discontinuous. When the diameter is reduced discontinuously, the first nozzle 220 may substantially define an orifice downstream of the first inlet part 210.

The term "orifice" means a fluid outlet port that is formed as a hole drilled in a wall of a pipe or a vessel.

Generally, since a flow speed of the fluid at the same height is increased when the fluid flows through a passage having a narrower cross section, and reduced when the fluid flows through a passage having a wider cross section, a flow speed of the first fluid while flowing through the first nozzle 220 is gradually increased, and thus the first fluid may be ejected at a high speed through a distal end of the downstream side of the first nozzle 220.

The fluid chamber 230 may be formed to be coaxially spaced apart from the first nozzle 220, and may include the first space portion 231 and the second space portion 232 having a larger inner diameter than that of the first space portion 231. However, the fluid chamber 230 is not divided into the first space portion 231 and the second space portion 232 by a partition or the like, and the first space portion 231 and the second space portion 232 may be mutually open and fluidically connected.

The first space portion 231 and the second space portion 232 may be respectively formed to have the same outer diameter and different inner diameters, and the inner diameter of the second space portion 232 may be larger than that of the first space portion 231, and thus a volume of the second space portion 232 may be smaller than that of the first space portion 231.

The outer circumferential surface of the fluid chamber 230 is connected to the second inlet part 240 which is a passage through which the second fluid is introduced from the outside, and an inner circumferential surface of the fluid chamber 230 is connected to the second nozzle 250 and the third nozzle 270 which are passages through which the second fluid flows from the fluid chamber 230 to the mixing chamber 260. Therefore, the fluid chamber 230 may be a middle flow base in the flow of the second fluid.

The second inlet part 240 is a passage through which the second fluid is introduced from the outside and flows to the fluid chamber 230, and may be radially connected to the outer circumferential surface of the fluid chamber 230.

The second inlet part 240 may be radially connected to an outer circumferential surface of the first space portion 231 of the fluid chamber 230, and thus flowability of the second fluid may be enhanced.

In one embodiment, the second inlet part 240 may include a plurality of pipes that are disposed and spaced apart from each other at a constant angular distance.

The pipes may be two to ten in number. In this case, the angular distance between the pipes may be 180°, 120°, 90°, 72°, 60°, 53°, 45°, 40°, and 36°.

By constantly defining the angular distance between the pipes, flow interference between the second fluids discharged through the pipes may be minimized, and thus the second fluid may be concentrated to an upstream side of the second nozzle 250 at a constant flow speed.

In one embodiment, the second inlet part 240 may include two pipes opposite to each other. In this case, the angular distance between the pipes may be 180°.

When the angular distance between the pipes is 180°, i.e., the angular distance between the pipes is at a maximum, the flow interference of the second fluids introduced through the pipes may be minimized, and the second fluid may more smoothly flow and may be concentrated to the upstream side of the second nozzle 250.

Figure 3:
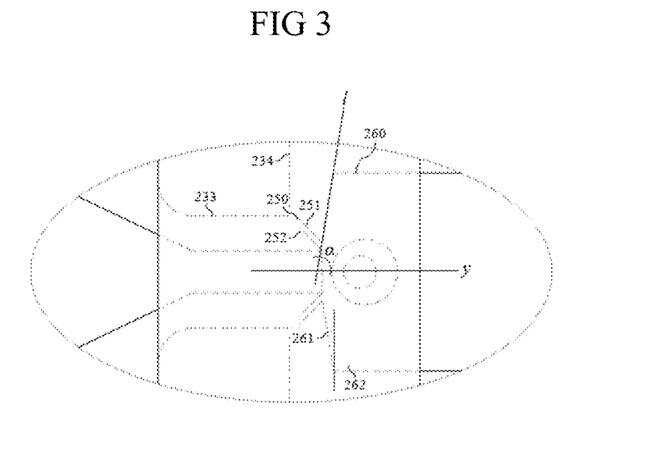
FIG. 3 is an enlarged view of the A portion of FIG. 2.

FIG. 3 is an enlarged view of the A portion of FIG. 2.

Referring to FIG. 3, the second nozzle 250 may be coaxially connected to the downstream side of the first space portion 231.

In one embodiment, the second nozzle 250 may be a ring-shaped passage that extends from a distal surface 234 of the downstream side of the first space portion 231 or an inner circumferential surface 233 of the first space portion 231, to a distal end of an upstream side of the mixing chamber 260.

The second nozzle 250 may include an outer wall 251 formed to extend from the distal surface 234 of the downstream side of the first space portion 231 to an expanded cross section portion 261 of the mixing chamber 260, and an inner wall 252 formed to extend from the inner circumferential surface 233 of the first space portion 231 to the distal end of the downstream side of the first nozzle 220. In this case, the outer wall 251 and the inner wall 252 of the second nozzle 250 may be spaced apart from each other to form a narrow passage through which the second fluid may flow.

Further, since the fluid chamber 230 and the mixing chamber 260 may be connected to each other by the outer wall 251 of the second nozzle 250, the second nozzle 250 may serve to fix the mixing chamber 260 spaced apart from an inner circumferential surface 235 of the second space portion 232 together with the third nozzle 270.

Also, since a distal end of the downstream side of the inner wall 252 of the second nozzle 250 may be connected with the distal end of the downstream side of the first nozzle 220, the second nozzle 250 may serve to fix the first nozzle 220 spaced apart from the inner circumferential surface 233 of the first space portion 231.

In one embodiment, a distal end of the downstream side of the second nozzle 250 may be formed around a distal end of the downstream side of the first nozzle 220.

The outer wall 251 and the inner wall 252 of the second nozzle 250 may be formed in cone shapes having a common axis, and a cross sectional area vertical to each axis of the outer wall 251 and the inner wall 252 may be gradually reduced from the upstream side to the downstream side.

That is, the cross sectional area of the downstream side of the second nozzle 250 may be smaller than that of the upstream side thereof, and the reduction in the cross sectional area may increase the flow speed of the fluid having a predetermined flow rate. Therefore, the second fluid may be ejected from the distal end of the downstream side of the second nozzle 250 to the mixing chamber 260 at a high speed.

Since the inner wall 252 of the second nozzle 250 may be formed to extend to the distal end of the downstream side of the first nozzle 220, and the distal end of the downstream side of the inner wall 252 may be connected with the distal end of the downstream of the first nozzle 220, the distal end of the downstream side of the second nozzle 250 may be formed around the distal end of the downstream side of the first nozzle 220.

A flow of the first fluid ejected from the distal end of the downstream side of the first nozzle 220 may have a circular shape in section, and a flow of the second fluid ejected from the distal end of the downstream side of the second nozzle 250 may have a ring shape in section, which is formed around (i.e., along a circumference of) the flow cross section of the first fluid.

In this case, the flow of the first fluid ejected from the first nozzle 220 and the flow of the second fluid ejected around (i.e., along a circumference of) the first fluid may interfere with each other and may be mixed with each other due to collision between the fluids.

The mixing chamber 260 may be formed to be coaxially connected to the downstream sides of the first nozzle 220 and the second nozzle 250 and also to be coaxially spaced apart from the inner circumferential surface 235 of the second space portion 232.

The mixing chamber 260 may be formed of a single circular pipe having a constant diameter, and may further include an expansion portion or a contraction portion of which a diameter is increased or reduced according to requirement of a demand side.

In one embodiment, the mixing chamber 260 may include the expanded cross section portion 261 and a constant cross section portion 262.

In the expanded cross section portion 261, a flow direction of the first fluid ejected from the distal end of the downstream of the first nozzle 220 and a flow direction of the second fluid ejected from the distal end of the downstream of the second nozzle 250 may be substantially the same. In this case, the mixing may occur due to "horizontal collision" between the first and second fluids.

The term "horizontal collision" means a mixing type in which the flow directions of the heterogeneous fluids ejected from nozzles or other equipment are substantially the same and the mixing occurs due to the collision between the flows, for example, turbulent flows of the fluids.

The mixing due to "horizontal collision" may be a pre-mixing, which mixes the first and second fluids before a final mixing process, and generates a first mixture.

The expanded cross section portion 261 may be formed to have a proper length so that the flow speeds of the first and second fluids respectively ejected from the distal ends of the downstream sides of the first and second nozzles 220 and 250 are not reduced.

In the constant cross section portion 262, the first mixture flowing from the expanded cross section portion 261 and the second fluid ejected from the third nozzle 270 may be finally mixed and may generate a final mixture, and the final mixture may flow to the next equipment (not shown).

In one embodiment, an angle α between a generatrix 1 of the expanded cross section portion 261 and an axis y of a downstream side of the mixing chamber 260 may be in a range of 70° to 90°, or 75° to 85°.

If the angle α is more than 90°, a bent portion between the expanded cross section portion 261 and the constant cross section portion 262 forms an acute angle. In this case, a side reaction between fluids separated from the main flows of the first and second fluids may occur in the bent portion. And since it is difficult to remove a by-product generated by the side reaction, maintenance costs of the reactor may be increased.

If the angle α is less than 70°, the length or volume of the expanded cross section portion 261 is excessively increased, and a stay time of the first and second fluids in the expanded cross section portion 261 may be increased. In this case, the first and second fluids are completely mixed in a non-uniform state, and thus mixing uniformity of the final mixture may be deteriorated.

Figure 4:
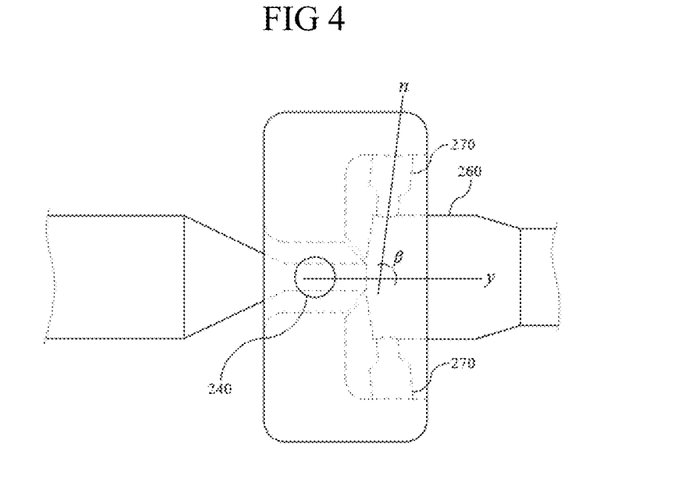
FIG. 4 is a cross-sectional view of the mixing reactor for heterogeneous fluids using high-speed ejecting when seeing from B of FIG. 2.

FIG. 4 is a cross-sectional view of the mixing reactor for heterogeneous fluids using high-speed ejecting when seeing from B of FIG. 2.

Referring to FIG. 4, the third nozzle 270 may extend from the inner circumferential surface 235 of the second space portion 232 and may be radially connected to the outer circumferential surface of the mixing chamber 260.

The third nozzle 270 may be radially connected to an outer circumferential surface of the constant cross section portion 262 of the mixing chamber 260 so that the final mixing is achieved before the flow speed of the first mixture flowing from the expanded cross section portion 261 of the mixing chamber 260 is lowered.

The third nozzle 270 is formed to extend from the fluid chamber 230, which is a flow base of the second fluid, to the mixing chamber 260, and the second fluid may flow through the third nozzle 270 as well as the second nozzle 250 and may be ejected from a distal end of the third nozzle 270 to the mixing chamber 260.

In one embodiment, the third nozzle 270 may include a plurality of nozzles that are disposed and spaced apart from each other at a constant angular distance.

The nozzles may be well-known nozzles generally used in the art, and may be nozzles designed so that each diameter thereof is gradually reduced toward an ejection port to increase the flow speed and finally generate a high flow speed of the fluid.

The nozzles may be two to ten in number. In this case, the angular distance between the nozzles may be 180°, 120°, 90°, 72°, 60°, 53°, 45°, 40°, and 36°.

By constantly defining the angular distance between the nozzles, distribution of the second fluid ejected to the first mixture may be substantially and uniformly maintained.

That is, when the first mixture and the second fluid are finally mixed, it is possible to enhance the mixing uniformity and prevent the unreacted first mixture from remaining in some areas, thereby reducing side reactions.

In one embodiment, the third nozzle 270 may include two nozzles that are symmetrical to each other with respect to an axis of the mixing chamber 260.

The term "axis" means a central axis of a rotating body, and in the case in which the chamber, the nozzle, the pipe, or other elements of the mixing reactor may be the rotating body, such as a cylinder or other similar shape, the "axis" means the central axis, if not otherwise defined.

The third nozzle 270 may include two nozzles that are symmetrical to each other with respect to the axis of the mixing chamber 260.

In the case in which the nozzles are not symmetrical to each other with respect to the axis of the mixing chamber 260, collision angles of the second fluid and the first mixture ejected from each nozzle may be different from each other, and thus the mixing distribution at the ejected flow cross section of the first mixture may be non-uniform. Therefore, the nozzles may be symmetrical to each other with respect to the axis of the mixing chamber 260.

In one embodiment, an angle β between an axis n of each symmetrical nozzle and the axis y of the downstream side of the mixing chamber 260 may be in a range of 70° to 90°, or 75° to 85°.

If the angle β between the axis n of each symmetrical nozzle and the axis y of the downstream side of the mixing chamber 260 has the above-mentioned ranges, the flow direction of the first mixture flowing from the expanded cross section portion 261 to the constant cross section portion 262, and the flow direction of the second fluid ejected to the mixing chamber 260 through the third nozzle 270 may be substantially vertical to each other. In this case, the mixing may occur due to "vertical collision" between the first and second fluids.

The term "vertical collision" means a mixing type in which the flow directions of the heterogeneous fluids ejected from nozzles or other equipment are substantially vertical to each other and the mixing occurs due to the collision between the flows, for example, turbulent flows of the fluids.

The mixing due to the "vertical collision" may be a final mixing which mixes the pre-mixed first mixture and second fluid and then generates a final mixture flowing to the reactor.

In one embodiment, the axis of each symmetrical nozzle and the axis of the mixing chamber 260 may be on the same plane.

When the axis of each symmetrical nozzle and the axis of the mixing chamber 260 are not on the same plane, the mixing distribution at the ejected flow cross section of the first mixture may be non-uniform.

Specifically, when the ejected flow cross section of the first mixture is divided into two areas based on the diameter of the mixing chamber 260, a mixing level at one particular area may be high, but a mixing level of the other area may be low or the mixing may not be achieved. Therefore, the axis of each symmetrical nozzle and the axis of the mixing chamber 260 may be on the same plane.

Figure 5:
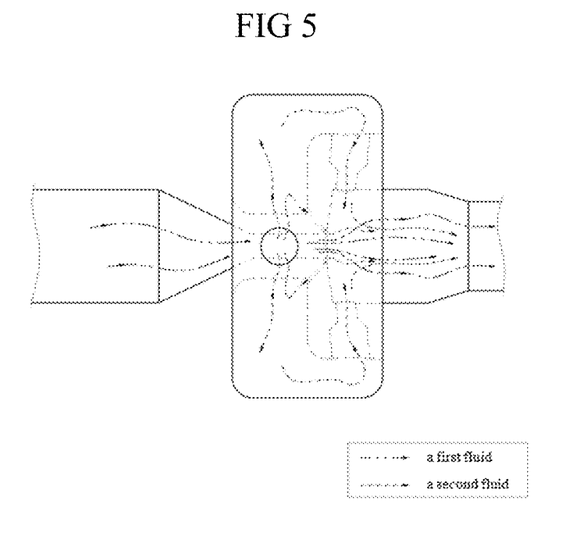
FIG. 5 is a schematic view illustrating a fluid flow in the mixing reactor for heterogeneous fluids using high-speed ejecting according to one embodiment of the present invention.

Fluid Flow in the Mixing Reactor for Heterogeneous Fluids Using High-Speed Ejecting FIG. 5 is a schematic view illustrating a fluid flow in the mixing reactor for heterogeneous fluids using high-speed ejecting according to one embodiment of the present invention.

Referring to FIG. 5, the first fluid may be ejected at high speeds to the mixing chamber 260 through the first inlet part 210 having a flow cross sectional area that is gradually reduced toward the flow direction of the first nozzle 220.

The second fluid is introduced to the fluid chamber 230 through the second inlet part 240, and part of the second fluid introduced into the fluid chamber 230 may be ejected at the high speed to the mixing chamber 260 through the second nozzle 250 having a cross sectional area which is gradually reduced toward the flow direction.

The flow direction of the first fluid ejected from the distal end of the downstream side of the first nozzle 220, and the flow direction of the second fluid ejected from the distal end of the downstream side of the second nozzle 250 are substantially horizontal with each other. However, in the expanded cross section portion 261 of the mixing chamber 260, the flow interference over a certain level may occur between the first and second fluids, and thus the pre-mixing of the first and second fluids may also occur due to the horizontal collision.

The rest of the second fluid introduced into the fluid chamber 230 may be ejected to the mixing chamber 260 at high speed through the third nozzle 270 formed to extend from the inner circumferential surface 235 of the second space portion 232 of the fluid chamber 230 to the outer circumferential surface of the mixing chamber 260.

The pre-mixed mixture of the first and second fluids may flow from the expanded cross section portion 261 of the mixing chamber 260 to the constant cross section portion 262 along the flow direction, may be finally mixed with the second fluid ejected from the distal end of the third nozzle 270 which is radially connected to the outer circumferential surface of the constant cross section portion 262, and then may flow to the next equipment.

In one embodiment, each of the first fluid and the second fluid may be independently and differently selected from an amine compound and a phosgene compound. That is, the first fluid may be the amine compound, and the second fluid may be the phosgene compound. In contrast, the first fluid may be the phosgene compound, and the second fluid may be the amine compound. The phosgene compound and the amine compound are raw materials that may be used in the manufacturing of isocyanate.

Particularly, in manufacturing aromatic isocyanates, the amine compound may be an aromatic amine compound. The aromatic amine compound may be one or more selected from the group consisting of 2,4'-methylene diphenyl diamine (MDA) or 4,4'-methylene diphenyl diamine, toluene diamine (TDA), hexamethylene diamine (HMD), diaminobenzene, 2,6-xylidine, naphthyl diamine (NDA), and an isomer compound thereof. In one embodiment the amine may be 2,4'-methylene diphenyl diamine (MDA) or 4,4'-methylene diphenyl diamine, and in another embodiment the amine may be 4,4'-methylene diphenyl diamine. In another embodiment, the aromatic amines to be used are without limitation.

The phosgene compound may include a material such as nickel or chlorine, and may be generally high purity phosgene that is about 100 weight % of phosgene.

That is, the 4,4'-MDA introduced from the outside through the first inlet part 210 may be ejected from the distal end of the downstream side of the first nozzle 220 to the mixing chamber 260, and the phosgene introduced from the outside through the second inlet part 240 may be ejected from the distal end of the downstream side of the second nozzle 250 and the distal end of the third nozzle 270 to the mixing chamber 260, and the ejected 4,4'-MDA and the phosgene are mixed in a phosgenation reaction in the mixing chamber 260, and thus 4,4'-methylene diphenyl diisocyanate (MDI) may be produced.

Specifically, the 4,4'-MDA ejected from the distal end of the downstream side of the first nozzle 220 and the phosgene ejected from the distal end of the downstream of the second nozzle 250 may be pre-mixed at the expanded cross section portion 261 of the mixing chamber 260 via horizontal collision. Then, the pre-mixed 4,4'-MDA and phosgene flows to the constant cross section portion 262 of the mixing chamber 260 along the flow direction, is completely mixed with the phosgene ejected from the distal end of the third nozzle 270 connected to the outer circumferential surface of the constant cross section portion 262 due to vertical collision, and then performs the phosgenation reaction, and thus the 4,4'-MDI may be produced.

The term "phosgenation reaction" is a reaction in which the amine compound and the phosgene compound are reacted to generate an intermediate of the isocyanate. When the amine compound is the MDA, it may be indicated by the following reaction formula 1:

[Reaction formula 1]

The amine compound and the phosgene compound may be respectively a liquid (i.e., a liquid phase) or a gas (i.e., a gas phase). The isocyanate, for example the MDI may be manufactured by a liquid phase phosgenation reaction, when the amine compound and the phosgene compound are the liquid phases, and/or by a gas phase phosgenation reaction, when the amine compound and the phosgene compound are the gas phases. Since the liquid phase phosgenation reaction may occur at a lower temperature than that of the gas phase phosgenation reaction, and an evaporation process of the reactants is not required, the amine compound and the phosgene compound may be respectively the liquid phase.

Hereinafter, an example of the present invention will be described in detail.

Example

The liquid MDA and the liquid phosgene are mixed using the mixing reactor for heterogeneous fluids using high-speed ejecting of FIGS. 2 to 4, which is designed to have the fluid flow as illustrated in FIG. 5.

Specifically, (i) the liquid MDA is introduced through the first inlet part and ejected to the mixing chamber through the first nozzle, and (ii) the liquid phosgene is introduced into the fluid chamber through the second inlet part having the two pipes (i.e., having an angular distance of 180°) radially connected to the outer circumferential surface of the fluid chamber and then ejected to the mixing chamber through the second nozzle and the third nozzle having the two nozzles (i.e., having an angular distance of 180°). Then, (iii) the liquid MDA is mixed and reacted with the liquid phosgene in the mixing chamber, and thus phosgenized. The angle α between the generatrix of the expanded cross section portion of the mixing chamber and the axis of the downstream side of the mixing chamber and the angle β between the axis n of each nozzle forming the third nozzle and the axis of the downstream side of the mixing chamber are 85°, respectively.

Comparative Example

Figure 7:
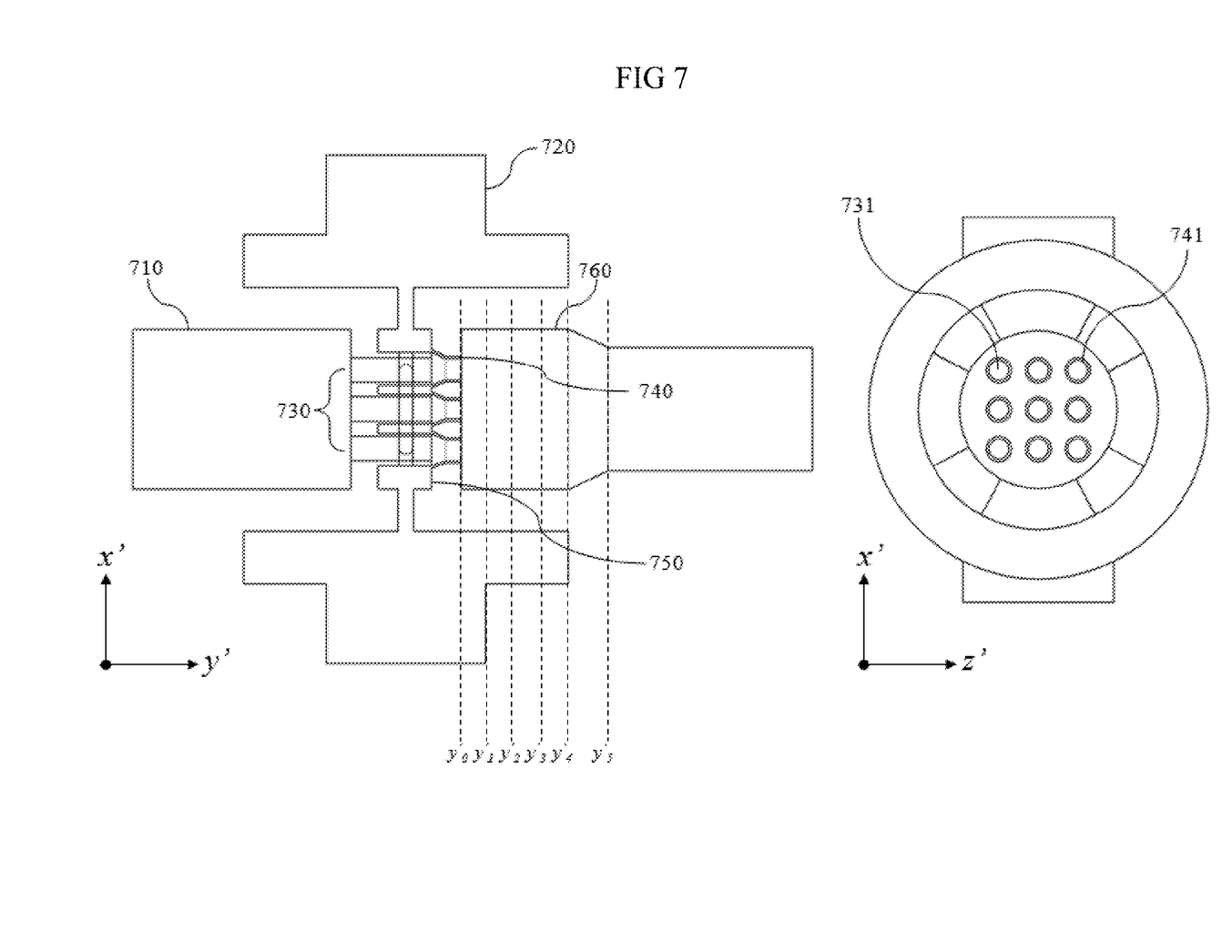
FIG. 7 is a cross-sectional view taken along x'-y' and x'-z' planes of a mixing reactor for heterogeneous fluids using high-speed ejecting according to a comparative example which is designed differently from one embodiment of the present invention.

FIG. 7 is a cross-sectional view taken along x'-y' and x'-z' planes of a mixing reactor for heterogeneous fluids using high-speed ejecting according to a comparative example which is designed differently from one example of the present invention.

Referring to FIG. 7, a mixing reactor 700 for heterogeneous fluids using high-speed ejecting according to a comparative example may include a first fluid passage 710 to which a first fluid is introduced from the outside; a second fluid passage 720 to which a second fluid is introduced from the outside; a first nozzle part 730 having a plurality of nozzles 731 configured to eject the first fluid flowing along the first fluid passage 710 to a mixing chamber; a second nozzle part 740 having a plurality of ring-shaped narrow passages 741 configured to eject the second fluid to the mixing chamber along an outer circumferential surface of each nozzle forming the first nozzle part 730; a fluid chamber 750 configured to serve as a flow base of the second fluid, which connects the second fluid passage 720 and the second nozzle part 740; and the mixing chamber 760 in which the first and second fluids respectively ejected from the first and second nozzle parts 730 and 740 are mixed and reacted.

Specifically, (i) the liquid MDA is introduced through the first fluid passage and ejected to the mixing chamber through the first nozzle part having 9 nozzles, and (ii) the liquid phosgene is introduced into the fluid chamber through the second fluid passage having two pipes radially connected to an outer circumferential surface of the fluid chamber and then ejected to the mixing chamber through the second nozzle part having 9 narrow passages defined around each nozzle forming the first nozzle part. Then, (iii) the liquid MDA is mixed and reacted with the liquid phosgene in the mixing chamber, and thus phosgenized.

Experimental Example: Measurement of Mixing Uniformity

The liquid MDA and the liquid phosgene are reacted using the mixing reactors for heterogeneous fluids using high-speed ejecting according to the embodiments of the example and the comparative example, such that the liquid MDA is phosgenized.

Figure 6:
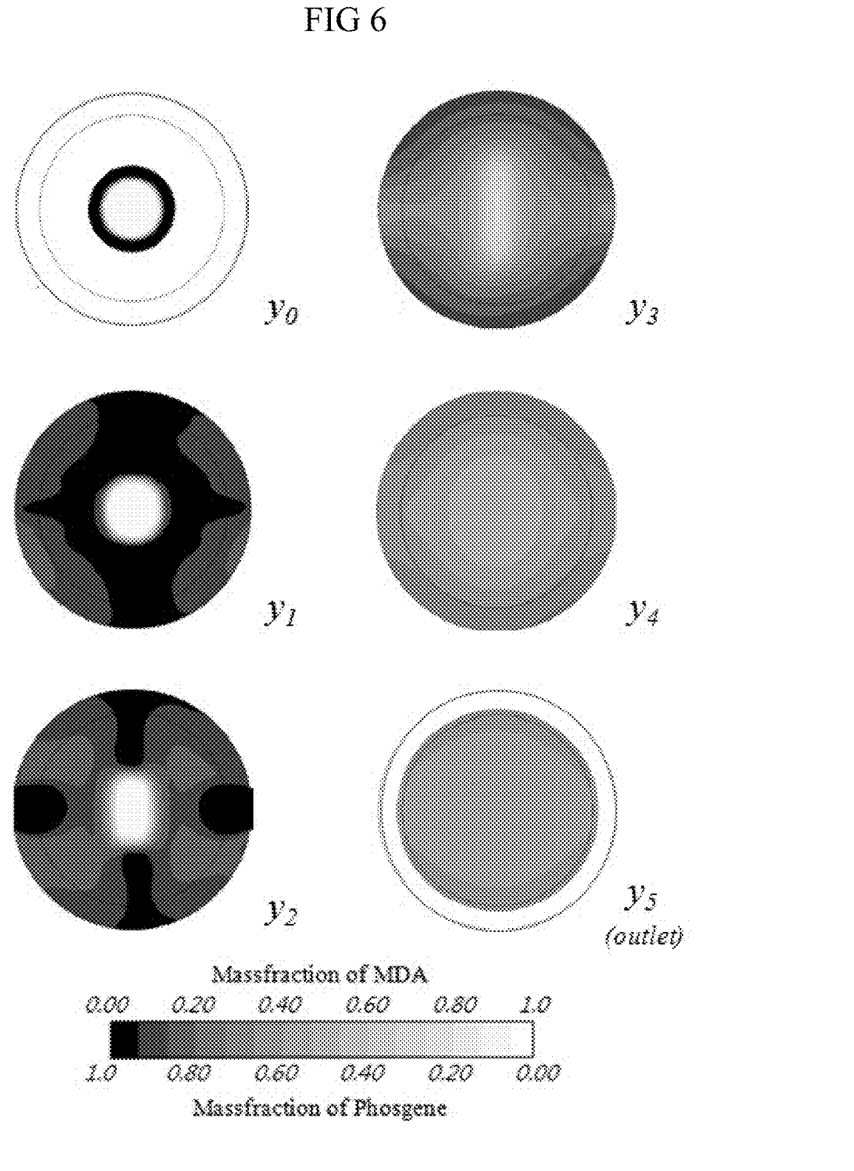
FIG. 6 is a schematic view illustrating mixing uniformity of an amine compound and a phosgene compound at a predetermined point of a y-axis of a fluid chamber according to one embodiment of the present invention.
Figure 8:
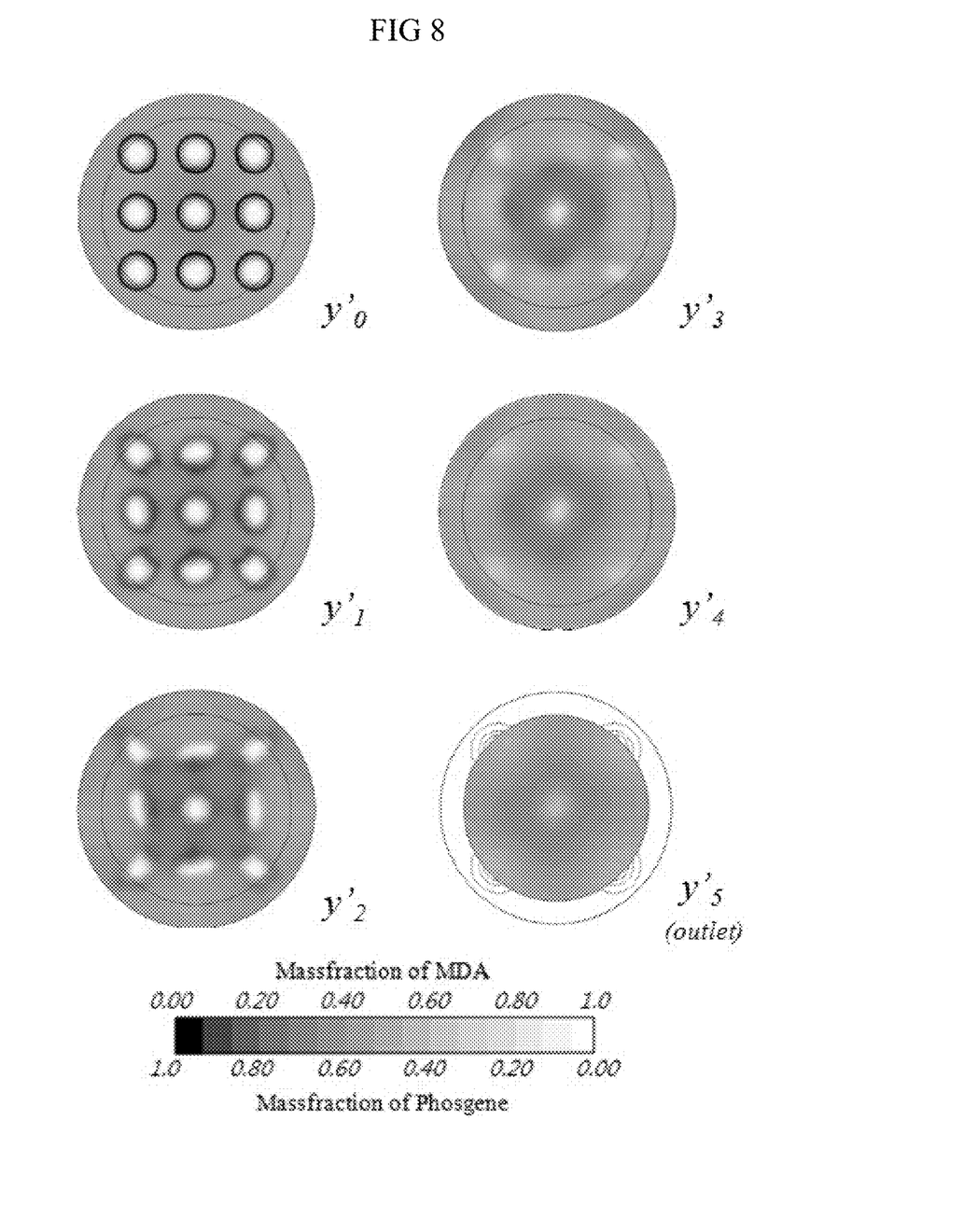
FIG. 8 is a schematic view illustrating mixing uniformity of an amine compound and a phosgene compound at a predetermined point of a y'-axis of a fluid chamber according to the comparative example of FIG. 7.

FIGS. 6 and 8 illustrate the mixing uniformity at the cross section vertical to the central axis of the mixing chamber when the liquid MDA and the liquid phosgene are reacted m using the mixing reactors for heterogeneous fluids using high-speed ejecting according to the embodiments of the example and the comparative example, respectively.

Referring to FIGS. 2 and 6, assuming that the distal surfaces of the downstream sides of the first and second nozzles in the mixing reactor for heterogeneous fluids using high-speed ejecting according to one example are y0, and the distal surface of the downstream side of the mixing chamber is y5 (i.e., outlet), a plurality of planes disposed therebetween to be parallel with them are y1, y2, y3, and y4, in turn, in a downstream direction.

In FIG. 6, a portion in which a mass fraction of the liquid MDA is 1.00, i.e., 100 weight % (i.e., a mass fraction of the liquid phosgene: 0.00, 0 weight %) is indicated by a white color, and a portion in which a mass fraction of the liquid MDA is 0.00, i.e., 0 weight % (i.e., a mass fraction of the liquid phosgene: 1.00, 100 weight %) is indicated by a black color. As illustrated in FIG. 6, it could be confirmed that the mixing uniformity of the liquid MDA and the liquid phosgene was gradually increased toward the downstream direction of the mixing chamber. Particularly, two areas in which the mass fraction of the liquid MDA was minutely different at the y5, which is the outlet of the mixing reactor for heterogeneous fluids using high-speed ejecting and also the distal surface of the downstream side of the mixing chamber, were observed, but the mass fraction of the liquid MDA was about 0.38 to 0.45 at both areas and satisfied the required mixing uniformity.

Meanwhile, referring to FIGS. 7 and 8, assuming that the distal surfaces of the downstream sides of the first and second nozzle parts in the mixing reactor for heterogeneous fluids using high-speed ejecting according to the comparative example are y'0, and the distal surface of the downstream side of the mixing chamber is y'S (outlet), a plurality of planes disposed therebetween to be parallel with them are y'1, y'2, y'3, and y'4, in turn, in a downstream direction.

In FIG. 8, the mixing uniformity of the liquid MDA and the liquid phosgene was gradually increased toward the downstream direction of the mixing chamber. However, this is because the liquid MDA and the liquid phosgene are mixed in the upstream side of the mixing chamber via horizontal collision, and after that, flow interference due to vertical collision does not occur. Therefore, it could be confirmed that the liquid phosgene ejected from the second nozzle part was not diluted by the liquid MDA while flowing from y'0 to y'4, and thus the mixing uniformity of both fluids was reduced. Particularly, five or more areas in which the mass fraction of the liquid MDA was different at y'5, which is the outlet of the mixing reactor for heterogeneous fluids using high-speed ejecting, and also the distal surface of the downstream side of the mixing chamber, were observed, and the mass fraction of the liquid MDA was irregularly radially increased or reduced from a center thereof.

According to one aspect of the present invention, the first and second fluids respectively ejected from the first nozzle and the second nozzle formed to be coaxial with the first nozzle are collided in a substantially horizontal direction, pre-mixed, and ejected to the mixing chamber, and the pre-mixed mixture is collided in a substantially vertical direction and finally mixed with the second fluid ejected from the third nozzle radially connected to the outer circumferential surface of the mixing chamber, and thus it is possible to enhance the mixing uniformity between the heterogeneous fluids, reduce side reactions, and thus improve reaction yield and reaction rate.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. A mixing reactor for heterogeneous fluids using high-speed ejecting, comprising:
  a first inlet part to which a first fluid is introduced from an outside;
  a first nozzle coaxially connected to a downstream side of the first inlet part to eject the first fluid;
  a fluid chamber formed to be coaxially spaced apart from the first nozzle and configured to have a first space portion and a second space portion having a larger inner diameter than that of the first space portion;
  a second inlet part radially connected to an outer circumferential surface of the fluid chamber and to which a second fluid is introduced from an outside;
  a second nozzle coaxially connected to a downstream side of the first space portion to eject the second fluid;
  a mixing chamber formed to be coaxially spaced apart from an inner circumferential surface of the second space portion and coaxially connected to downstream sides of the first nozzle and the second nozzle; and
  a third nozzle configured to extend from the inner circumferential surface of the second space portion and radially connected to an outer circumferential surface of the mixing chamber to eject the second fluid.

2. The mixing reactor of claim 1, wherein the mixing chamber comprises an expanded cross section portion and a constant cross section portion, and an angle between a generatrix of the expanded cross section portion and an axis of a downstream side of the mixing chamber is within a range of 70° to 90°.

3. The mixing reactor of claim 1, wherein the second inlet part comprises a plurality of pipes formed to be spaced apart from each other at a constant angular distance.

4. The mixing reactor of claim 3, wherein the second inlet part comprises two pipes opposite to each other.

5. The mixing reactor of claim 1, wherein the second nozzle is a ring-shaped fluid passage formed to extend from a distal surface of the downstream side of the first space portion or an inner circumferential surface of the first space portion to a distal end of an upstream side of the mixing chamber.

6. The mixing reactor of claim 5, wherein a distal end of the downstream side of the second nozzle is formed around a distal end of the downstream side of the first nozzle.

7. The mixing reactor of claim 1, wherein the third nozzle comprises a plurality of nozzles formed to be spaced apart from each other at a constant angular distance.

8. The mixing reactor of claim 7, wherein the third nozzle comprises two nozzles that are symmetrical to each other with respect to an axis of the mixing chamber.

9. The mixing reactor of claim 8, wherein an angle between an axis of each nozzle and an axis of the downstream side of the mixing chamber is within a range of 70° to 90°.

10. The mixing reactor of claim 9, wherein the axis of each nozzle and the axis of the downstream side of the mixing chamber are on the same plane.

11. The mixing reactor of claim 8, wherein the axis of each nozzle and the axis of the downstream side of the mixing chamber are on the same plane.

12. The mixing reactor of claim 1, wherein each of the first fluid and the second fluid is independently and differently selected from an amine compound and a phosgene compound.

13. The mixing reactor of claim 12, wherein the amine compound is an aromatic amine compound.

14. The mixing reactor of claim 13, wherein the aromatic amine compound is one or more selected from the group consisting of 2,4'-methylene diphenyl diamine (MDA) or 4,4'-methylene diphenyl diamine, toluene diamine (TDA), hexamethylene diamine (HMD), diaminobenzene, 2,6-xylidine, naphthyl diamine (NDA), and an isomer compound thereof.

\* \* \* \* \*